(12) United States Patent
Lamonte

(10) Patent No.: US 8,858,124 B2
(45) Date of Patent: Oct. 14, 2014

(54) EXCAVATION SYSTEM

(75) Inventor: Larry R. Lamonte, Baton Rouge, LA (US)

(73) Assignee: BOH Bros. Construction Co., LLC, Baton Rouge, LA (US)

( * ) Notice: Subject to any disclaimer, the term of this patent is extended or adjusted under 35 U.S.C. 154(b) by 0 days.

(21) Appl. No.: 13/877,569

(22) PCT Filed: Oct. 12, 2011

(86) PCT No.: PCT/US2011/055870
§ 371 (c)(1),
(2), (4) Date: Apr. 3, 2013

(87) PCT Pub. No.: WO2012/051234
PCT Pub. Date: Apr. 19, 2012

(65) Prior Publication Data
US 2013/0189060 A1    Jul. 25, 2013

Related U.S. Application Data

(60) Provisional application No. 61/392,318, filed on Oct. 12, 2010.

(51) Int. Cl.
*B60P 1/60*    (2006.01)
*E02F 7/00*    (2006.01)
*E02F 3/88*    (2006.01)
*E02F 3/90*    (2006.01)
*E02F 3/92*    (2006.01)
*E21B 7/18*    (2006.01)
*B65G 53/30*   (2006.01)

(52) U.S. Cl.
CPC ... *E02F 7/00* (2013.01); *E21B 7/18* (2013.01); *B65G 53/30* (2013.01); *E02F 3/8825* (2013.01); *E02F 3/90* (2013.01); *E02F 3/905* (2013.01); *E02F 3/925* (2013.01); *Y10S 37/905* (2013.01)
USPC .................... 406/40; 37/323; 37/905; 175/67

(58) Field of Classification Search
USPC .......................................... 406/40
See application file for complete search history.

(56) References Cited

U.S. PATENT DOCUMENTS

| | | | |
|---|---|---|---|
| 3,412,862 A | | 11/1968 | Chaplin et al. |
| 3,876,260 A | * | 4/1975 | Moss et al. ...................... 406/29 |
| 4,020,697 A | | 5/1977 | Jander |
| 4,659,262 A | | 4/1987 | van Aalst |
| 4,795,217 A | * | 1/1989 | Hilaris ......................... 299/36.1 |
| 4,942,682 A | | 7/1990 | McDowell |
| 5,016,717 A | * | 5/1991 | Simons et al. .................. 175/66 |
| 5,120,165 A | * | 6/1992 | Walko, Jr. ....................... 406/40 |
| 5,135,058 A | * | 8/1992 | Millgard et al. ................ 175/71 |
| 5,299,370 A | * | 4/1994 | Gyori et al. ..................... 37/347 |

(Continued)

*Primary Examiner* — William R Harp
(74) *Attorney, Agent, or Firm* — Roy Kiesel Ford Doody & Thurmon APLC

(57) ABSTRACT

An excavation system utilizes a vacuum truck having a vacuum system in combination with a small backhoe to which an excavator assembly is affixed to the backhoe extendable and articulating arm whereby manipulation of the excavator assembly can be controlled by an operator positioned in the backhoe operator cab. The vacuum assembly and the excavator assembly are operatively attached by an elongated, at least partially flexible vacuum hose operatively attached to the vacuum truck pump to permit material that is excavated to be transported from the excavator assembly to the vacuum assembly for storage or disposal.

22 Claims, 7 Drawing Sheets

(56) References Cited

U.S. PATENT DOCUMENTS

| | | | |
|---|---|---|---|
| 5,361,855 A * | 11/1994 | Schuermann et al. | 175/67 |
| 5,487,229 A * | 1/1996 | Nathenson et al. | 37/347 |
| 5,535,836 A * | 7/1996 | Cagianut et al. | 175/213 |
| 5,860,232 A | 1/1999 | Nathenson et al. | |
| 6,202,330 B1 * | 3/2001 | Bolton | 37/403 |
| 6,385,867 B1 * | 5/2002 | Slabach et al. | 37/304 |
| 6,453,584 B1 * | 9/2002 | Buckner | 37/323 |
| 6,470,605 B1 | 10/2002 | Gilman et al. | |
| 6,484,422 B1 * | 11/2002 | Bain et al. | 37/323 |
| 6,604,304 B1 * | 8/2003 | Slabach et al. | 37/304 |
| 6,751,893 B2 * | 6/2004 | Sullivan et al. | 37/195 |
| 6,817,119 B2 | 11/2004 | Kerfoot | |
| 6,988,568 B2 * | 1/2006 | Buckner | 175/67 |
| 7,047,676 B2 | 5/2006 | Nicholson et al. | |
| 7,484,322 B2 | 2/2009 | Maybury, Jr. et al. | |
| 7,503,134 B2 * | 3/2009 | Buckner | 37/317 |
| 7,526,884 B2 | 5/2009 | Taplin | |
| 7,606,648 B2 | 10/2009 | Shepherd et al. | |
| 7,644,523 B2 | 1/2010 | Buckner | |
| 2003/0154634 A1 | 8/2003 | Thomas | |
| 2010/0095559 A1 * | 4/2010 | Buckner | 37/304 |
| 2010/0326481 A1 * | 12/2010 | Buckner | 134/166 C |

\* cited by examiner

Fig 2
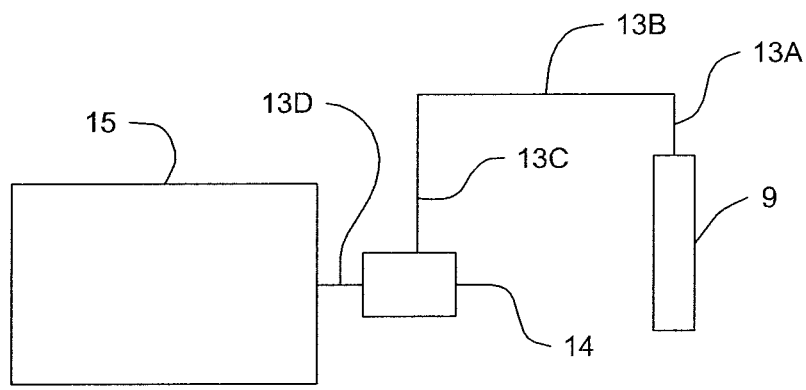
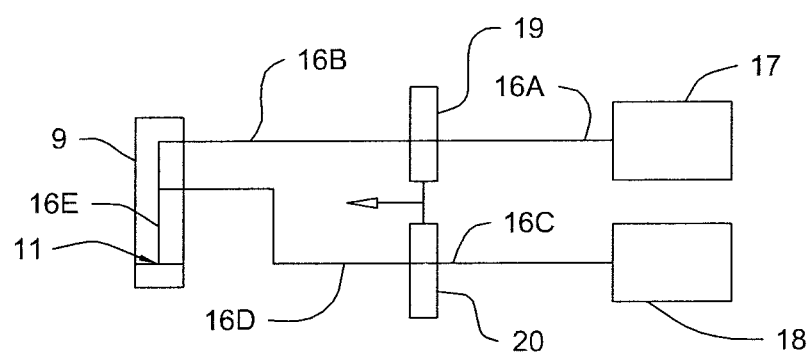
Fig 3

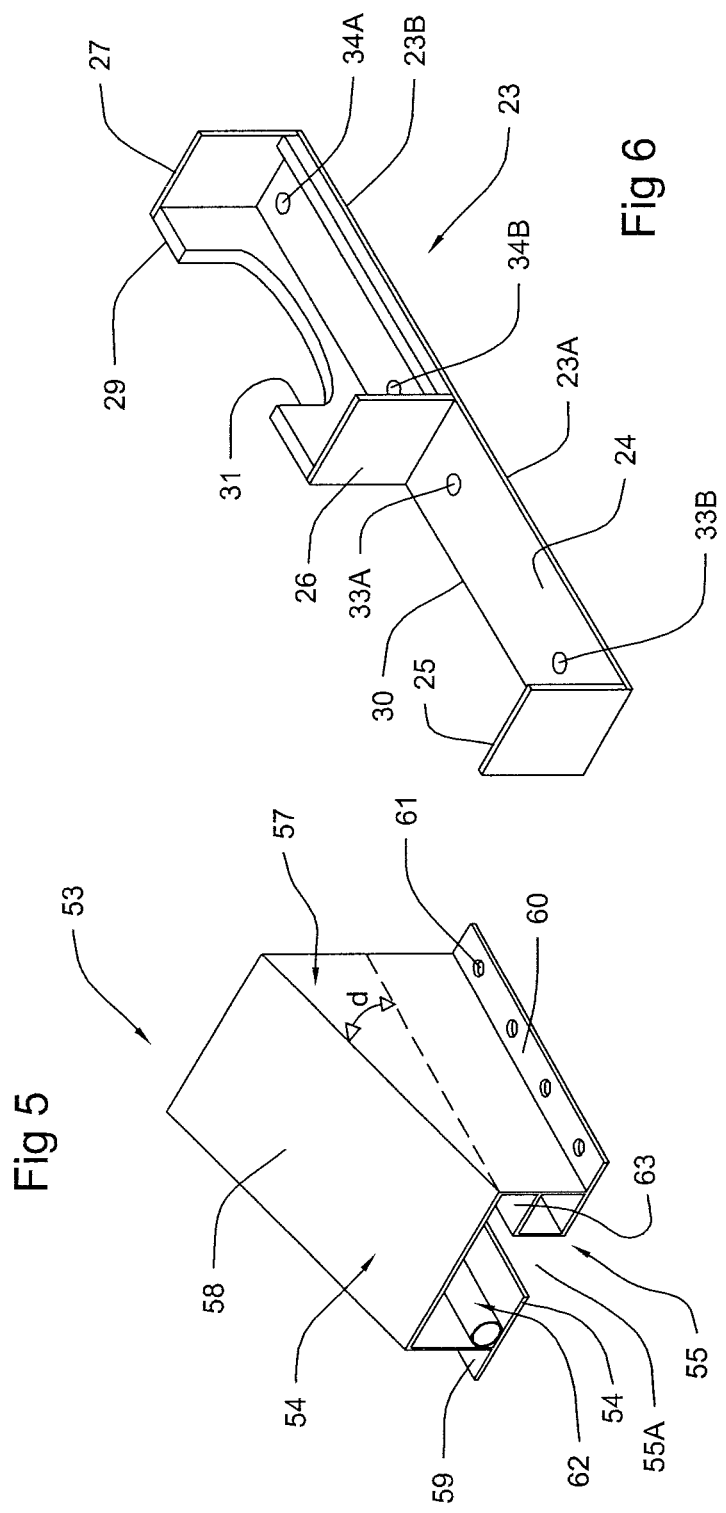

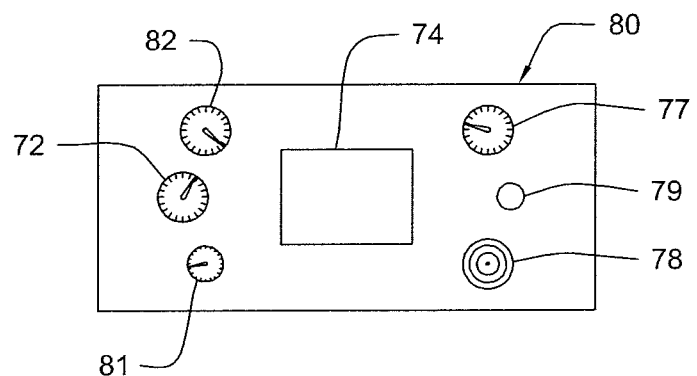
Fig 7
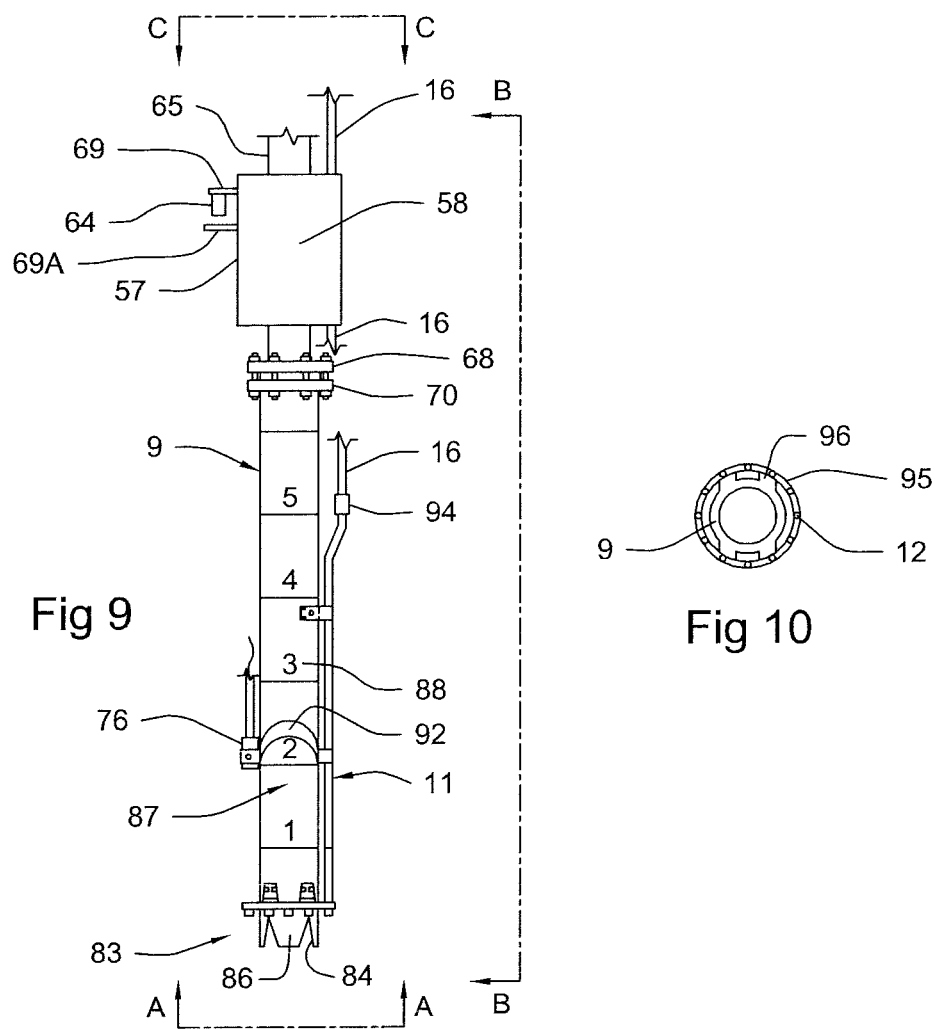
Fig 9
Fig 10

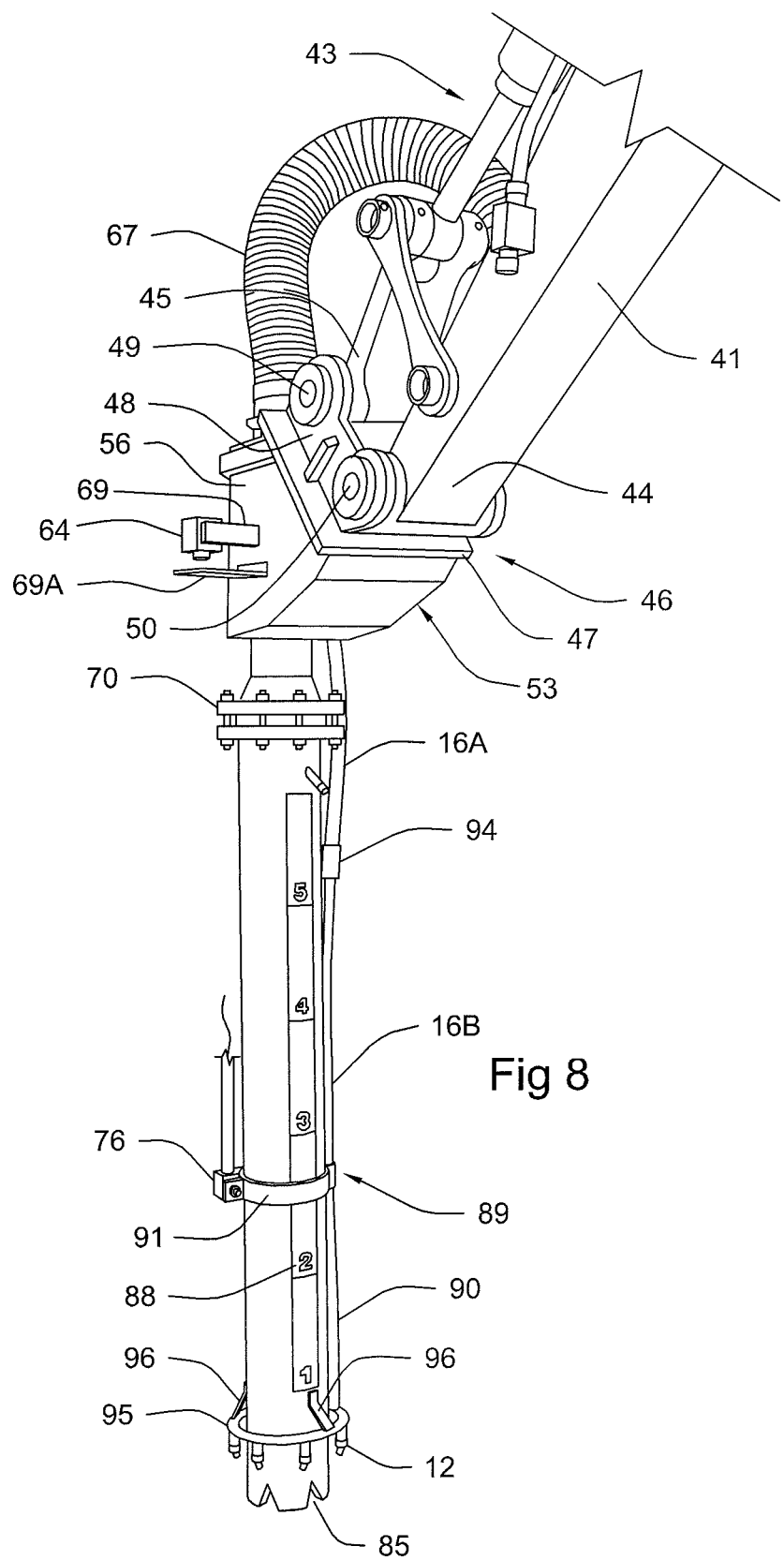

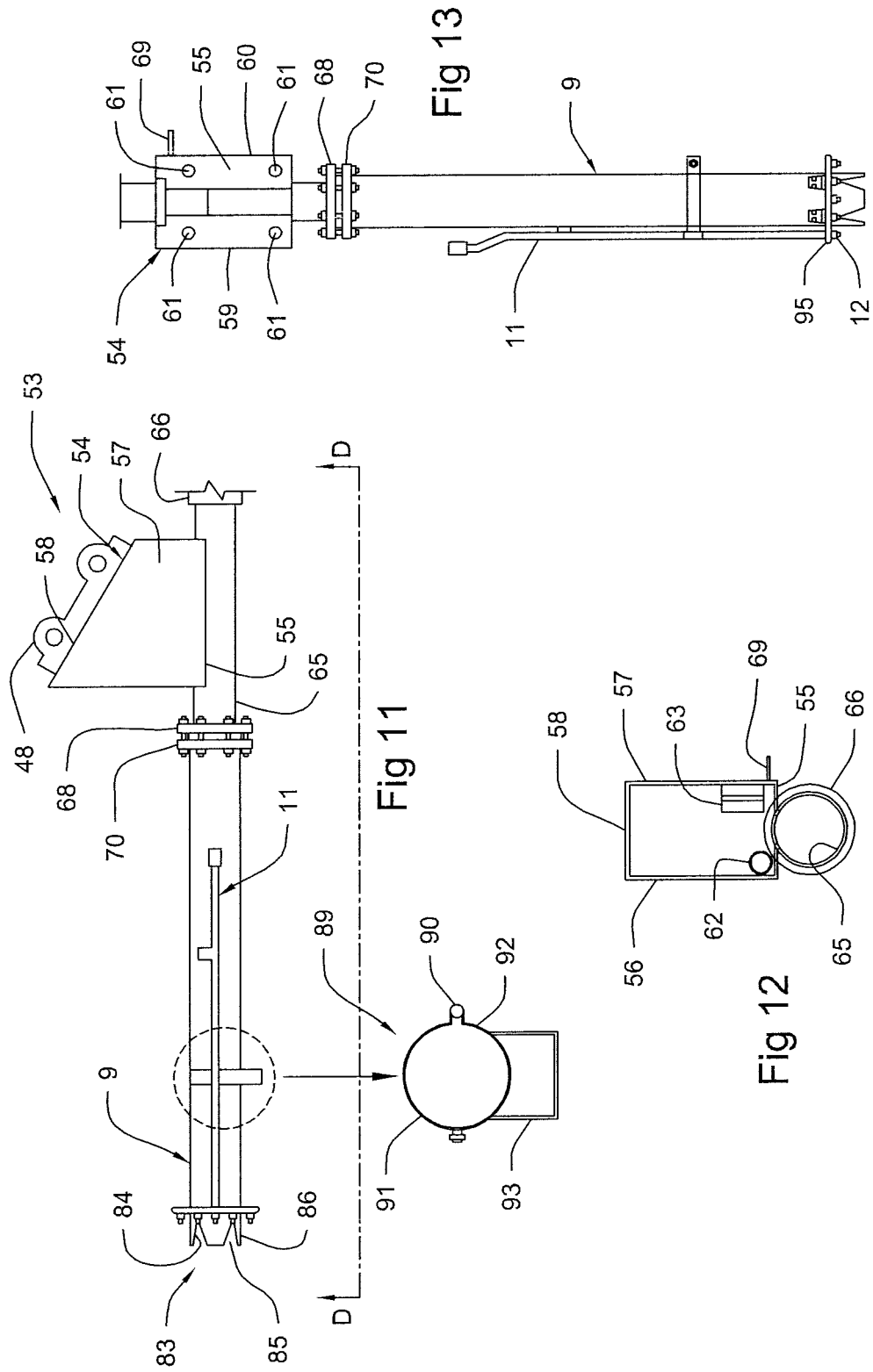

EXCAVATION SYSTEM

BACKGROUND OF THE INVENTION

1. Field of the Invention

This invention relates in general to excavators, and more particularly to soil excavators used for trenching at commercial and industrial sites.

2. Background of the Invention

There has been for some time various water jet/vacuum excavators used to expose underground utilities or piping, as well as for cutting precise trenches for installation of utility lines or piping.

In these prior art excavators, the excavation is achieved through use of a high pressure water jet (>1,200 psi) and the removal of the excavated soil through use of a vacuum system. One example of such excavators is described in U.S. Pat. No. 6,484,422. However, these prior art devices are not capable of operating in all of the various field conditions where the excavation may be desired. In many instances these excavators do not have the mobility necessary to efficiently make the desired shaped trench, or the ability to maneuver in narrow spaces to get to the excavation site, or require too much down time to dispose of the collected excavated soil or are not constructed to efficiently excavate the site. Nor are this prior art devices constructed to deliver other equipment or material to the excavated site without extensive maneuvering or removal of field structures.

Yet another problem is the requirement for extensive equipment operator training. Still further, many of these prior art excavators required multiple personnel to operate the excavation equipment. In many cases the operating personnel have to be positioned in environmental or safety hazardous places that can cause harm or injury to the operating personnel.

Still further, many of these prior art excavators do not have the ability to perform other function that are commonly required in a trenching operation, such as breaking up concrete, picking up and removing obstacles to the excavation process, or cutting material for removal from the excavation site, etc. thus requiring additional equipment and lost down time.

In addition, it is difficult to determine the depth of the excavation during the excavating process, as well as it is difficult for the operator of the excavation equipment to confirm that soil is actually being excavated or determine if the excavated material may be clogging the vacuum hose that removes the material from the site.

Another problem with the use of these prior art excavation devices is damage caused by the trenching tubes striking the coated surfaces of pipes and/or utility lines that are buried underground at the excavation site. Also, a problem is the inability of these prior art excavation devices to be able to detect if explosive gases or environmentally harmful fumes have been released during the excavation operations.

Finally, these prior art excavators are primarily constructed to perform vertical surface trenching, and are not capable of efficiently performing horizontal trenching under pipes or other surface material, such as a concrete slab.

OBJECTS AND SUMMARY OF THE INVENTION

Therefore, one object of one embodiment of the invention is to provide an excavation system having greater mobility and maneuverability.

Another object of one embodiment of the invention is to provide an excavation system that is simple to operate without special training and which reduces the environmental and safety risks to the operating personnel.

Still another object of one embodiment of the invention is to provide an excavation system that has the ability to provide extensive trenching with minimal downtime to remove the collected soil and other excavated material.

A further object of one embodiment of the invention is to provide an excavation system that can perform more than an excavation function.

A further object of one embodiment of the invention is to provide an excavation system that can be operated by a single operator.

A further object of one embodiment of the invention is to provide an excavation system constructed to permit the operator to easily determine during the excavation process that material is being excavated from the site and that the material is not clogging the vacuum hose used to remove the material.

Another object of one embodiment of the invention is to provide a vacuum hose constructed to minimize clogging and provide better lift characteristics in removing the excavated material from the site to the system storage tank.

Another object of one embodiment of the invention is to provide an excavation tubing that reduces or eliminates damage to underground pipe coating and utilities buried at the excavation site.

A still further object of one embodiment of the invention is to provide a nozzle assembly that can utilize one or more fluid mediums to cut the material to be excavated, and which can more efficiently cut the material.

A still further object of one embodiment of the invention is to provide an excavation system that can efficiently perform horizontal trenching under objects or a solid surface.

A still further object of one embodiment of the invention is to provide an excavation system that can provide warning of an unsafe or hazardous environment at the excavation site.

These and other objects and advantages of this invention shall become apparent from the ensuing descriptions of the invention.

Accordingly, this invention in one embodiment comprises an excavation system having a first vehicle on which is mounted a vacuum assembly. This first vehicle may be self-driven or may be constructed to be towed near the excavation site for use. A preferred first vehicle would be a conventional vacuum truck having a vacuum assembly. The vacuum assembly comprises one or more material storage tanks, a pump or similar device that can create vacuuming conditions within the vacuum hose having a discharge port operatively attachable to the material storage tank for receiving excavated material from the vacuum pump, and the elongated vacuum hose having an intake end and a discharge end, wherein the discharge end is operatively attachable to an intake port of the pump. The excavation system further includes a high pressure fluid delivery assembly (>1200 psi) mountable on the first vehicle. The high pressure fluid delivery assembly includes at least one fluid supply source, such as a tank, a high pressure pump having an output port and an input port operatively attached to the at least one fluid supply tank to receive fluid in the fluid supply tank, and an elongated high pressure fluid hose operatively attached at its input end to the pump output port to receive the fluid from the pressure pump.

In a preferred embodiment the fluid may be air, water or a combination of both. In another preferred embodiment the pressure pump is selected having the ability to pulsate the fluid through the fluid hose. If multiple fluids are utilized, then separate pressure pumps and separate fluid hoses may be used for each fluid.

In another preferred embodiment the vacuum hose includes a rigid section provided with elbows to increase the lift capability of the excavation system to transport the excavation material to the storage tank. In another preferred embodiment the vacuum hose includes a transparent section visible from within the backhoe cab to permit an operator to determine if excavated material is flowing through the vacuum hose.

The excavation system further including a power source mounted on the first vehicle operatively connected to the vacuum assembly to provide power to operate the vacuum assembly and to the high pressure fluid delivery assembly to provide power to operate the high pressure fluid delivery assembly.

The excavation system further includes a second maneuverable vehicle having an articulated, extendable arm, and an accessory mounting structure affixed at the extending end of the extendable arm. In a preferred embodiment the second vehicle would be a small backhoe to permit it to be maneuvered through narrow rows of piping of other site structures to get to the excavation site.

The excavation system also includes an excavator assembly comprising an elongated, hollow rigid excavator tube attachable to the accessory mounting structure, the rigid tube having a lower end with an intake port and an upper end with a discharge port, the discharge port operatively attachable at one end to the intake end of the vacuum hose to deliver excavated material to the vacuum hose.

In a preferred embodiment the intake port of the excavator tube is provided with a resilient coating, such as a soft rubber, to minimize any damage that might result should the intake port strike an underground pipe coating or utility line during the excavation process.

In another preferred embodiment the excavator assembly is affixed to the backhoe accessory mounting structure by a mounting adaptor structured to permit the excavator tube to be positioned for vertical trenching or to permit the excavator tube to be positioned for horizontal trenching. In a more preferred embodiment the mounting adaptor has a housing to contain a camera power source, such as a battery, and an exterior plate to which a camera can be mounted for viewing the excavation process. In another more preferred embodiment the mounting adaptor has a rigid discharge tube affixed to housing and is affixed at one end to the discharge port of the excavator tube and affixed at its other end to the intake port of the vacuum hose to permit excavated material to pass through the excavator tube, the discharge tube, the vacuum hose and into the storage tank.

The excavation system further comprises a fluid jetting assembly that includes a nozzle assembly provided with one or more nozzles operatively affixed to the lower intake end of the rigid tube to direct the fluid outward from the intake end of the tube to the excavation site. In a preferred embodiment the nozzle assembly is constructed to permit the nozzles to rotate about the excavator tube, and more preferably to be adjustable in the direction that they direct the fluid.

In another preferred embodiment a vacuum gauge will be operatively connected to the vacuum hose to monitor the pressure within the vacuum hose and affixed to the second vehicle at a position that can be observed by the operator of the second vehicle for purposes of determining if the vacuum hose is becoming clogged by the excavated material.

The excavation system can further comprise a surveillance assembly having a camera mounted to the excavator tube or to the accessory mounting structure or to the extendable arm of the second vehicle. The camera is directed toward the excavation site and operatively connected to a monitor for receiving images transmitted by the camera and positioned in the second vehicle whereby the images may be viewed by the excavation system operator during operation of the excavation system. In a more preferred embodiment a second camera will be mounted to the second vehicle where it can be directed to record the rear of the second vehicle when the second vehicle is being backed up. The second camera is operatively connected to a monitor positioned in the cab of the backhoe to permit the operator to view the images from the second camera.

In another preferred embodiment a gas detector gauge having its sensor affixed to the excavator tube at a position to detect the presence of predetermined gases in the excavation trench. The gas detection gauge and any associated warning lights or horns are positioned on an instrument panel in the backhoe cab to be visible to or heard by the operator.

In still another preferred embodiment a trench depth measuring device is positioned to visually advise the operator of the depth of the excavation trench.

BRIEF DESCRIPTION OF THE DRAWINGS

The accompanying drawings illustrate a preferred embodiment of this invention. However, it is to be understood that this embodiment is not intended to be exhaustive, nor limiting of the invention. It is but one example of the construction of the improved excavation system of this invention.

FIG. 2 is a schematic illustration of the excavated material flow from the excavation site into the excavator tube and through the vacuum assembly hoses to the vacuum assembly vacuum pump and then to the storage tank.

FIG. 3 is a schematic illustration of the high pressure fluid flow from the water storage tank through high pressure fluid delivery system hoses to the fluid jetting assembly of the excavator assembly.

FIG. 5 is a three-quarter perspective view of the mounting adapter used to attached the vacuum assembly to the backhoe accessory mounting structure.

FIG. 6 is a three-quarter perspective view of the bracket used to attach the second section of the vacuum hose/piping to the backhoe arm.

FIG. 7 is a front view of an instrument panel positioned in the backhoe cab to provide excavation information to the operator.

FIG. 8 is a perspective view of the excavator assembly affixed to the backhoe accessory tool mount by mounting adaptor and further illustrating the depth indicator strip extending vertically along the outside surface of the excavator tube.

FIG. 9 is a front view of a preferred embodiment of the excavator assembly.

FIG. 10 is a bottom view of the excavator assembly viewed from Section arrows A -A of FIG. 9.

FIG. 11 is a side view of the excavator assembly taken along section arrows B-B of FIG. 9.

FIG. 12 is a top view of the excavator assembly viewed from section arrows C-C of FIG. 9.

FIG. 13 is a rear view of the excavator assembly taken along section arrows D-D of FIG. 11.

PREFERRED EMBODIMENTS OF THE INVENTION

Without any intent to limit the scope of this invention, the preferred embodiments of the invention are described for an embodiment specifically adopted for use in industrial plant sites.

Figure 1:
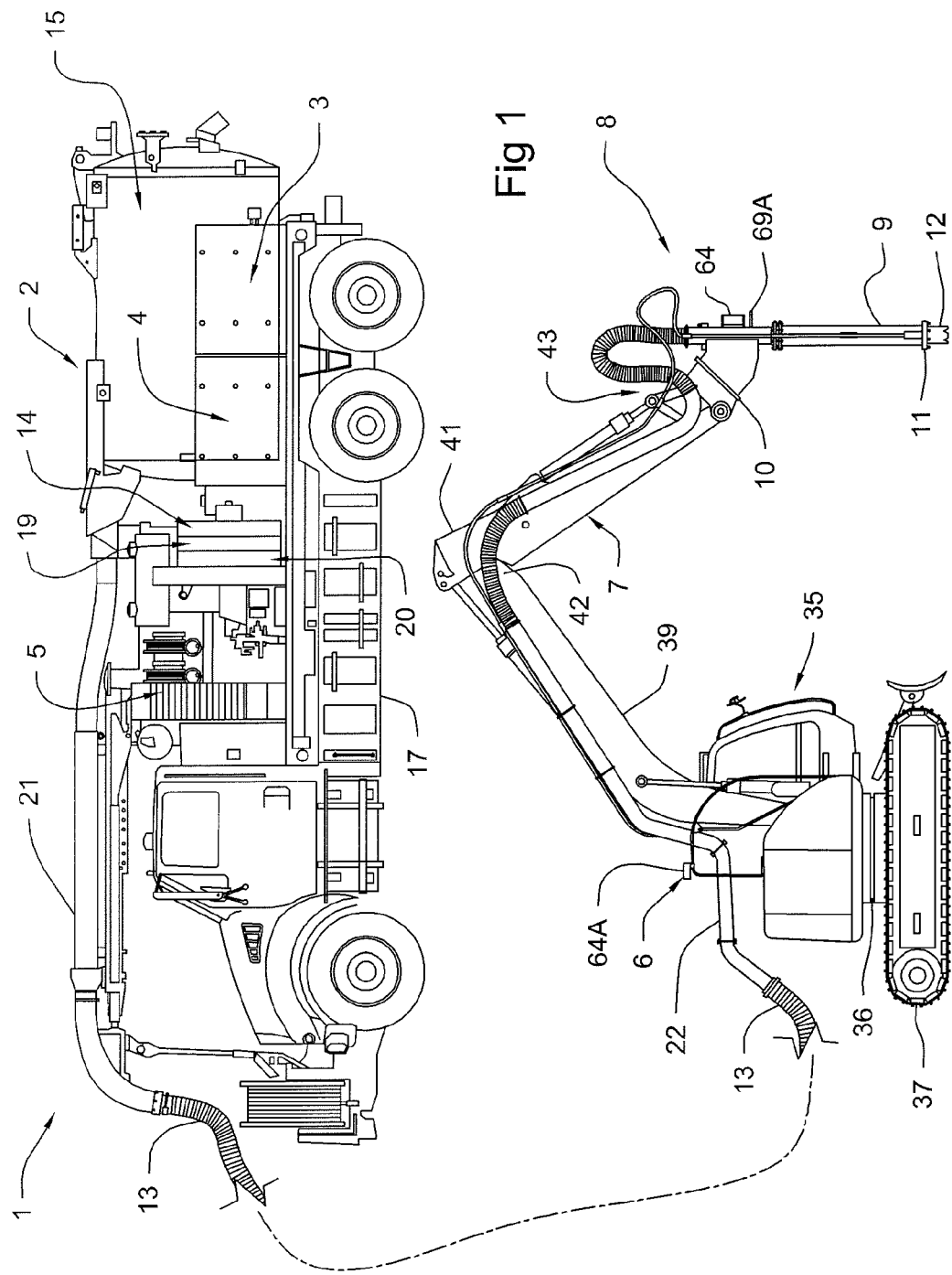
FIG. 1 is a side view of a preferred embodiment of the excavation system of this invention that includes the use of a conventional vacuum truck, a conventional small backhoe and the excavator assembly of this invention.

As indicated in FIG. 1 in one preferred embodiment of the invention the excavation system 1 comprises a first vehicle, such as a conventional vacuum truck 2, having mounted thereon a vacuum assembly 3, a high pressure fluid delivery assembly 4, one or more power sources 5 used to operate the vacuum assembly 3 and the high pressure fluid delivery assembly 4. The excavation system 1 also comprises a relatively small, maneuverable vehicle 6 having an extendible and articulating arm 7, such as a small backhoe. The excavation system 1 still further comprises an excavator assembly 8 having a rigid excavator tube 9 attachable to the extendible and articulating arm 7 of the backhoe 6 via a mounting adaptor 10. The excavator assembly 8 also includes a fluid jetting assembly 11 having nozzles 12 directed toward the excavation site.

As illustrated in the schematics of FIGS. 2 and 3, to operatively connect the elements of excavation system 1 the vacuum assembly 3 further comprises appropriate hoses and/or piping 13A-13D to operatively connect the excavator tube 9 to pump 14 of vacuum assembly 3 to permit excavated material to be transported from the excavation site through hoses 13A-13D to a storage tank 15 of vacuum assembly 3. There also appropriate hoses and/or piping 16A-16B and/or 16C-16E to operative connect a water reservoir, such as water tank 17 and/or an air source 18 to respective pumps 19 and 20 of the fluid jetting assembly 11 and then to the nozzles 12 of the high pressure fluid delivery assembly 4 for the purpose of directing fluid, such as air, water or a combination of both, to the fluid jetting assembly nozzles 12 to cut and otherwise break into smaller pieces the material to be excavated. In a preferred embodiment, it is desirable to be able to control the speed of pumps 14, 19, and 20 to permit the person operating the excavation system 1 to control the various aspects of the process. One way this could be done is to utilize known variable speed pumps.

A typical vacuum truck 2 will be equipped with a water tank 17 having a high capacity water pump 19 that is operatively attached by piping 16A to draw water from the water tank 17 and deliver it to high pressure hose 16B that is coiled on a conventional reel mounted to truck 2. The hose 16B can then be uncoiled so that it extends to the excavation site. In a preferred embodiment of this invention fluid delivery pump 19 through a conventional directional flow control valve [not shown] or other similar known flow control apparatus operatively attached to the intake port of pump 19 can receive water from alternate water sources that may be available at the excavation site. This provides several advantages not found in the conventional vacuum truck. First, if such a water source (e.g., pond, river, lake, or man-made water delivery system) is available, then it is not necessary to haul water to the excavation site. Still further, there would not be a need to shut down the excavation process to drive the vacuum truck 2 back to a water source to refill the water tank 17. In the typical vacuum truck 2 the end of hose 16B will be attachable to a nozzle assembly that will be directed to the area to be excavated. The nozzle assembly will be either hand held or affixed to a rotatable and extendable boom structure 21. Because the water is being delivered under high pressure it is dangerous for the person manhandling the nozzle and less efficient and effective in trenching at the excavation site. However, in this invention hose 16B (and any number of extension hoses desired) is attached to rigid piping section 16C that is attached to backhoe 6. As becomes clear, this eliminates the need to use an operator to handle the nozzle assembly or the need to position the large vacuum truck 2 near the excavation site. Still further, this eliminates the need to maneuver the vacuum truck 2 in order to maintain the proper position of the nozzle assembly during the excavation process. Instead the necessary maneuvering can be done by the smaller and more nimble backhoe 6.

In many instances the excavation material may be polluted and required to be delivered to a reclamation facility for treatment. When storage tank 15 becomes full it is necessary to shut down the excavation process while the vacuum truck 2 travels to the reclamation facility to unload the collected excavation material. To eliminate this problem and to provide for a more efficient process, it is preferred storage tank 15 be detachable from vacuum truck 2 for delivery to the reclamation facility by a third vehicle, and that a second storage tank be available to continue to receive collected excavation material while the first tank is being emptied at the reclamation facility. In this embodiment the second tank would be constructed for attachment to the third vehicle or the vacuum truck so that it could later be delivered to the reclamation facility.

Figure 4:
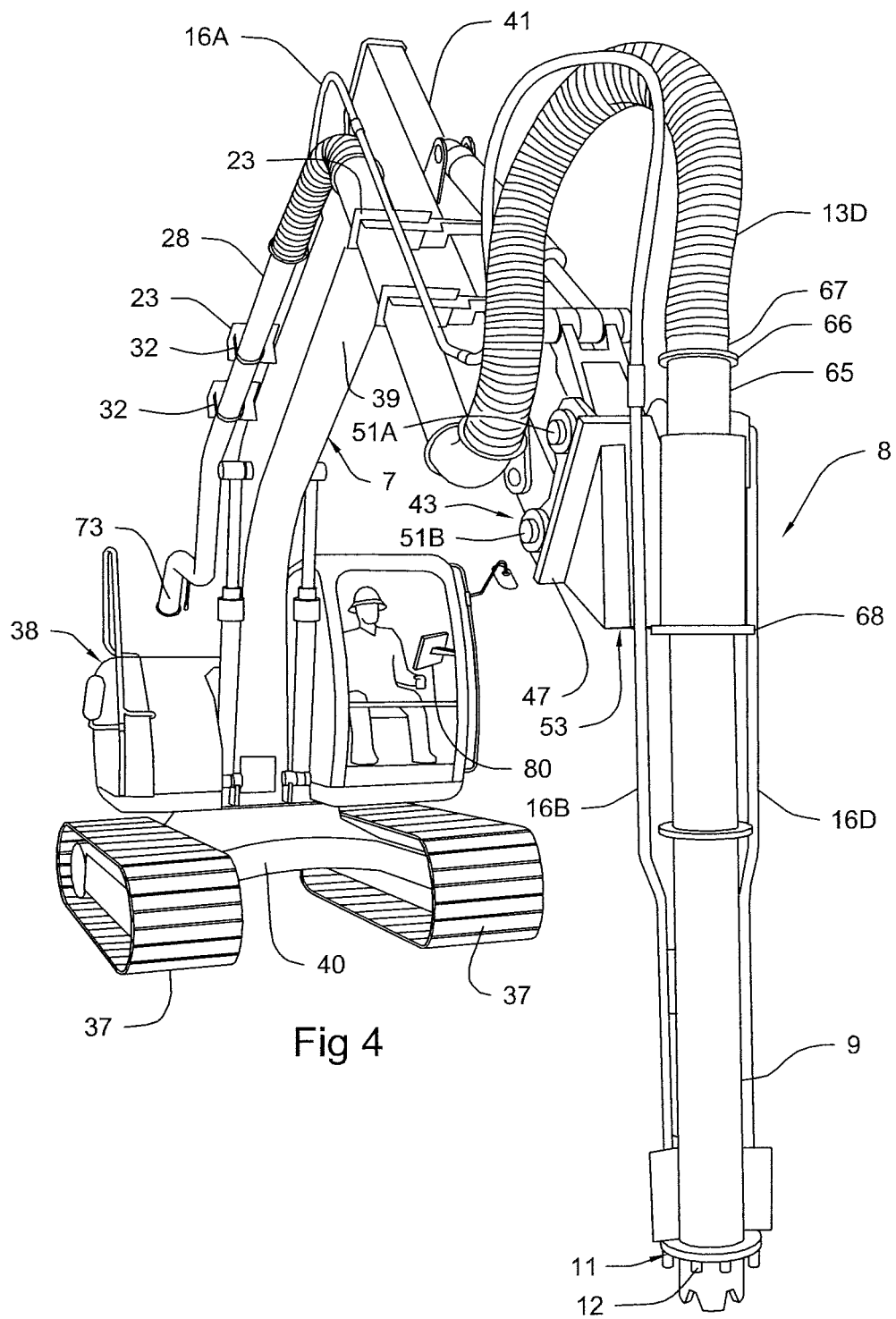
FIG. 4 is a three-quarter perspective view of the third elbow section and the fourth flexible section of the vacuum excavation assembly hoses positioned on the backhoe.

FIG. 4 illustrates a preferred embodiment of the third section 13C of vacuum hosing/piping 13. In this preferred embodiment the third section 13C will include rigid elbow shaped areas 22 whose design will provide for better vacuum lift forces to pick up and transport the collected excavation material through the various hose/piping sections 13A-13D to storage tank 15. This construction will further minimize clogging of the various hose/piping sections 13A-13D by the collected excavation material. Section 13C is attached to the frame of the backhoe arm 7 by brackets 23, such as illustrated in FIG. 6. Because different backhoes utilize different shaped arm 7, bracket 23 is preferably constructed to fit the backhoe being used. However, in one embodiment bracket 23 is constructed having an elongated top metal strip 24 with three metal plates 25, 26 and 27 extending perpendicularly down from top metal strip 24. Plates 25 and 26 along with the section of strip 24 running between plates 25 and 26 form a first section 23A that extends over and is attachable to the backhoe arm 7 by bolts (not shown) extending through bolt openings 33A and 33B, or by welding strip 24 to the backhoe arm 7, or other known means to backhoe arm 7. Plates 26 and 27 along with the section of strip 24 running between plates 36 and 27 form a second section 23B shaped to receive a straight portion 28 of elbow section 13C. The second section 23B is provided with a plate 29 extending between plates 26 and 27 along a portion of one edge 30 of top strip 24 and having a cut-out section 31 to form a cradle in straight section 28 can be positioned. A U-shaped bolt 32 sized to fit over straight portion 28 and into bolt openings 33A and 33B in top strip 24 is used to secure elbow section 13C to bracket 23.

As seen in FIGS. 1, 4-6 and 8, a conventional small backhoe 6 includes a cab 35 mounted atop a rotatable platform 36 operatively positioned over a pair of tracks 37 that are driven by a motor 38 to maneuver backhoe 6 into the desired location. Extending from platform 36 is extendable and articulated arm 7. Arm 7 comprises a first arm section 39 extending outward from the front 40 of the backhoe platform 36. It further comprises a second arm section 41 pivotally attached at the extended end 42 of the first section 39 that extends further outward from the backhoe 6. In addition arm 7 comprises a third hydraulic piston section 43 pivotally attached at the extended end 44 of the second arm section 41. An accessory mounting structure 46 is pivotally fixed to the extended end 44 and to the piston rod end 45. Various conventional accessory tools may be bolted to accessory mounting structure 46. One advantage of utilizing a small backhoe 6 as the second vehicle is the ability to attach multiple tools, such as hydraulic hammers to break up concrete, rakes and grapples to remove heavy objects from the excavation site, rock grinders, etc. to accessory mounting structure 46. Typically, structure 46 comprises a metal plate 47 having a pair of separated parallel shoulder plates 48. Each plate 48 has two bolt openings 49 and 50 that are aligned with the corresponding two bolt openings in the other plate 48 to permit two bolts 51A and 51B to be inserted through the aligned openings, respectively. One pair of aligned openings 49 or 50 are further aligned with openings in the extending end 44 of the second arm section 41 so that bolt 51A can be inserted through the aligned openings. In similar fashion the third hydraulic piston section 43 has openings in its extending end 45 that can be aligned with openings 50 so that bolt 51B can be inserted through the aligned openings. In this construction plate 47 can then be manipulated by the backhoe operator to be positioned in a variety of angles. In one preferred embodiment plate 47 has bolt openings on opposite perimeter sections to permit a wide variety of tools to be attached to plate 47, including excavator assembly 8.

To attach excavator assembly 8 a mounting adaptor 53, such as illustrated in FIGS. 5, 8 and 11-13, is used to attach excavator assembly 8 to accessory mounting structure 46. Mounting adaptor 53 includes a housing 54 formed from a bottom plate 55 that can be welded to an extension tubing 65 of excavator tube 9, two trapezoidal shaped side walls 56 and 57 extending vertically from bottom plate 55 and a roof 58 extending between side walls 56 and 57. As illustrated in FIG. 5, positioned about two of the perimeter sections 59 and 60 of bottom plate 55 are a series of bolt openings 61 that can be aligned with bolt openings 52 to permit housing 54 to be bolted to the accessory mounting structure 46. Alternatively, as illustrated in FIGS. 11-13 bottom plate 55 has a center gap 55A running the length of plate 55 (see FIG. 5) to permit contact with extension tubing 65 to allow bottom plate 55 to be welded to extension tubing 65. In a preferred embodiment the incline angle a formed in the trapezoidal side walls 56 and 57 is selected to permit the excavator assembly 8 to be positioned perpendicularly to the surface of the excavation site for vertical trenching, or selected to permit the excavator assembly 8 to positioned horizontally to the surface for horizontal trenching under slabs or other surface objects. Inside housing 54 and affixed near the corner formed by bottom plate 55 and vertical side wall 56 is an open end pipe 62 sized to permit the high pressure water line to extend through pipe 62. In the opposite corner formed by bottom plate 55 and vertical side wall 57 is battery housing 63 sized to permit a power source for a video camera 64 to be inserted within battery housing 63. Extending outward from side wall 57 is camera support structure 69 on which camera 64 is mounted in a position to be directed toward the material intake opening of excavator tube 9. In another preferred embodiment a plexiglass or other transparent plate 69A can be positioned in front of the camera 64 to prevent any material from striking the lens during the excavation process.

Mounting adaptor 53 further includes extension tubing 65 having a first end flange 66 shaped to receive and attached to the extending end 67 of flexible vacuum hose fourth section 13D. At its opposite end tubing 65 has a second end flange 68 structured to affix to flange 70 of excavator tube 9. In a preferred embodiment the flexible fourth section 13D of vacuum hose/piping is sufficiently transparent to permit an operator in the backhoe cab 35 to see excavated material flowing through the fourth section 13D. In another preferred embodiment a vacuum pressure gauge 72 having its pressure sensor 73 operatively located to measure the pressure within the vacuum hose/piping will be positioned within backhoe cab 35 to permit the operator to monitor the vacuum pressure within the vacuum hose and determine if the vacuum hose is becoming clogged by the collected excavation material. In still another preferred embodiment of this invention a monitor 74 operatively connected to receive video from camera 64 is positioned within backhoe cab 35 to permit the operator to observe the excavation occurring. In a preferred embodiment a Plexiglas or other clear member 69A is placed in front of the lens of camera 64 to protect it from flying debris or mud during the excavating process. As a safety measure to prevent the backhoe from hitting an object during the maneuvering of the backhoe 6, it is preferred a second camera 64A be mounted to backhoe 6 in a position to video the area behind the backhoe cab 35 and transmit those images a second monitor located within the backhoe cab 35 where the operator can see the transmitted images. If desired monitor 74 can be used to receive and display the images from both cameras. In still another preferred embodiment a gas detector 75 having its sensor 76 affixed to excavator tube 9 at a position to detect the presence of one or more predetermined gases in the excavation trench is utilized. A preferred position would be about 1-3 feet from the lower end 83 of excavator tube 9. The gas detector gauge 77 or other audible horn or speaker 78 or visual warning light 79 are operatively mounted on instrument panel 80 located in backhoe cab 35 to permit the operator to see and/or hear the indication of the presence of the predetermined gases in the excavation trench. FIG. 7 illustrates such an instrument panel 80 that would include vacuum gauge 73, monitor 74, gas detection gauge 77, horn 78, warning light 79, as well as information display devices, such as a trench depth monitor 81 if a conventional laser system is utilized. The instrument panel 80 can also be provided with as many of other indicator gauges 82 needed to display other information that may be desired by the operator.

Referring now to FIGS. 8-13, lower end 83 of excavator tube 9 contains a series of notches 84 around its circumference that when lower end 83 is resting on the trench floor forms a series of openings 85 through which broken down material can pass when vacuumed into excavator tube 9. In a preferred embodiment the lower end 83 is coated with a soft plastic or rubber compound to form a resilient surface 86 in order to minimize any damage to an underground pipe coating or surface, as well as minimize any damage to a utility line when struck by the lower end 83 during the excavation process. Excavator tube is provided with a flange 87 at its upper end to provide a connection with the lower flange 68 of discharge tubing 65.

In a preferred embodiment the front surface 87 of excavator tube 9 is marked with depth indicators 88 that represent the depth of the excavated trench. More preferably each one foot of depth is painted a separate color from the adjacent markings to provide better visibility to the backhoe cab operator.

Fluid jetting assembly 11 is affixed to excavator tube 9 by one or more clamps 89, preferably by welding fluid jetting assembly pipe 90 between first and second clamp pieces 91 and 92 forming clamp 89. In a preferred embodiment a rest member 93 is affixed to each clamp 89 to provide protection to excavator tube 9 from being hit during transportation or during the excavation process. Rest member 93 also provides a means to support excavator tube 9 in an elevated position when it is not being used which can keep fluid jetting assembly 11 from being damaged. Pipe 90 is provided with a coupling 94 to connect to fluid delivery hoses 16.

Fluid jetting assembly 11 further comprises a series of nozzles 12 operatively mounted on a circular tube 95 that is affixed to excavator tube 9 by brace members 96. In turn fluid jetting assembly pipe 90 is operatively attached to circular tube 95 so that high pressure fluid from pipe 90 flows into tube 95 and out through nozzles 12 to strike the material to be excavated. In a preferred embodiment one or more of nozzles 12 can be adjusted to direct the high pressure fluid exiting the nozzles in a desired direction, such as inward toward the area beneath the notches 84 in order to obtain more efficient break up of the material to be excavated.

In operation the vacuum truck 2 and backhoe 6 are delivered to the site area. The vacuum truck 2 is positioned as close to the excavation area as practical. At that point backhoe 6 to which the excavator assembly 8 has been operatively attached is maneuvered to the excavation site. If needed the high pressure hoses 16 of fluid delivery assembly 4 is operatively connected to the water source and/or air source for delivery to the excavator assembly 8. The backhoe operator manipulates the backhoe arm 7 through the hydraulic system of backhoe 6 to position the fluid jetting assembly 11 and its nozzles 12 to begin the excavating process. The vacuum hose pump 14 and the water and/or air pumps 19/20 are activated to begin the delivery of the fluids and the vacuuming of the broken up material. The various information data is collected and displayed by the gauges, horn and warning lights 72, 77-79 and 81 attached to instrument panel 80. Once the excavation has reached a desired depth as indicated by gauge 81 or by observation of the depth indicator markings 88 on evacuator tube 9, the backhoe operator moves the backhoe as needed to continue the trenching.

There are of course many alternate constructions that are obvious from this description of the invention and the photographs of one embodiment of the invention. It is the intent of application that this invention also includes these obvious embodiments.

What I claim is:

1. A vacuum excavation system including a vacuum truck having a vacuum assembly having a vacuum hose, a high pressure fluid delivery assembly having fluid dispersing piping, and a power source operatively connected to the vacuum assembly and the high pressure fluid delivery assembly to create a vacuum in the vacuum hose and to deliver the fluid under high pressure through the piping, the improvement to which comprises:
   a. a backhoe having a mobile support base, an extending, articulating arm pivotally attached at one end to the support base and an opposing end extendable from the support base with an accessory mounting member structure at the opposing end; and
   b. an excavator assembly comprising:
      i. a mounting adaptor attachable to the accessory mounting structure wherein the arm can operatively position the excavator assembly at the site being excavated, the mounting adaptor comprises separated side plates, each plate having a first edge, an opposing edge and side edges between the first edge and the opposing edge, the first edge affixed vertically along the rigid tube, and the opposing edge being at an angle to the first edge, wherein the angle being selected to permit the backhoe arm to position the rigid tube perpendicular to the site to be excavated;
      ii. a hollow rigid excavator tube attachable to the mounting adapter, the excavator tube having a lower end with an intake port and an upper end with a discharge port, the upper end operatively attachable at one end to the intake end of the vacuum hose, the lower end having at least two positioning members extending from the lower end a predetermined distance; and
      iii. a fluid jetting assembly affixed to the excavator tube having a nozzle assembly operatively attachable to the discharge end of the fluid piping to receive and redirect the fluid under pressure to the site to be excavated.

2. The vacuum excavation system according to claim 1, wherein the vacuum hose comprises:
   a. a first connection section operatively and pivotally connected to the intake port of the vacuum pump;
   b. a second flexible extension section operatively attached to the first connection section to permit the vacuum truck to be position at some distance from the backhoe;
   c. a third rigid elbow section operatively attached to the second flexible extension section and mounted to the backhoe; and
   d. a fourth section having at least one flexible piece operatively attached to the third elbow section to permit the extension and articulation of the backhoe arm.

3. The vacuum excavation system according to claim 1, further comprising a surveillance assembly, the surveillance assembly comprising:
   a. a video camera attached to the mounting adapter at a position to be directed to the excavation site,
   b. a video transmitter operatively attached to the video camera to receive and transmit images from the video camera; and
   c. a monitor located inside the operator cab, positioned to be visible to an operator in the operator cab, and operatively connected to the video transmitter to receive and display the transmitted images from the video camera.

4. A vacuum excavation system for excavating material from a site, comprising:
   a. a first vehicle;
   b. a vacuum assembly mounted on the first vehicle, the vacuum assembly comprising:
      i. a material storage tank,
      ii. a vacuum pump having an intake port and a discharge port, the discharge port operatively attachable to the material storage tank to permit material discharged from the vacuum pump to be received in the material storage tank,
      iii. an elongated vacuum hose having an intake end and a discharge end, the discharge end operatively attachable to the intake port of the vacuum pump;
   c. a high pressure fluid delivery assembly comprising:
      i. a fluid pump having an input port operatively attachable to a fluid supply tank to receive fluid and a discharge port to discharge at high pressure fluid entering the input port,
      ii. piping operatively attached at its input end to the output port of the fluid pump to receive the high pressure fluid from the fluid pump;
   d. a power source operatively connected to the vacuum assembly to provide power to operate the vacuum pump and to the high pressure fluid delivery assembly to provide power to operate the fluid pump;
   e. a second vehicle, the second vehicle having an extendable, articulating arm with an accessory mounting structure mounted on the arm;

f. an excavator assembly comprising:
  i. a mounting adaptor attachable to the accessory mounting structure wherein the arm can operatively position the excavator assembly at the site being excavated, wherein the mounting adaptor comprises:
    1. separated side plates, each plate having a first edge, an opposing edge and side edges between the first edge and the opposing edge, the first edge affixed vertically along the rigid tube, and the opposing edge being at an angle to the first edge;
    2. an adaptor plate affixed to the opposing edges; and
    3. a backhoe arm mounting member shaped and structured to be attachable to the accessory mounting structure;
  ii. a rigid excavator tube attachable to the mounting adapter, the excavator tube having an intake port and a discharge port, the discharge port operatively attachable at one end to the intake end of the vacuum hose; and
  iii. a fluid jetting assembly affixed to the excavator tube having a nozzle assembly operatively attachable to the discharge end of the fluid piping to receive and redirect the fluid under pressure to the site to be excavated.

5. The vacuum excavation system according to claim 4 further comprising a gas detector having a sensor affixed to the excavator tube at a position to operatively receive gases emitted from the site.

6. The vacuum excavation system according to claim 4, wherein the power source comprises a first power source to operate the vacuum assembly and a second power source to operate the high pressure fluid delivery assembly.

7. The vacuum excavation system according to claim 6, wherein the second power source is a variable power source to permit modulation of the delivery rate of the fluid.

8. The vacuum excavation system according to claim 4, wherein the second vehicle is a backhoe having an operator cab containing controls for operating the extending, articulating arm, the vacuum assembly, and the high pressure fluid delivery assembly.

9. The vacuum excavation system according to claim 4, further comprising
  a surveillance assembly, the surveillance assembly comprising:
    a. a video camera attached to the mounting adapter at a position to be directed to the excavation site,
    b. a video transmitter operatively attached to the video camera to receive and transmit images from the video camera; and
    c. a monitor located inside the operator cab, positioned to be visible to an operator in the operator cab, and operatively connected to the video transmitter to receive and display the transmitted images from the video camera.

10. The vacuum excavation system according to claim 9, wherein the surveillance assembly further comprises:
  a. a second video camera mounted to the backhoe at a position to be directed to the area located behind the backhoe;
  b. a second video transmitter operatively attached to the second video camera to receive and transmit images from the second video camera; and
  c. a second monitor located inside the operator cab, positioned to be visible to an operator in the operator cab, and operatively connected to the second video transmitter to receive and display the transmitted images from the second video camera.

11. The vacuum excavation system according to claim 10, wherein the monitor is electronically structured to receive transmitted images from multiple cameras and simultaneously display the transmitted images separately from each of the multiple cameras and wherein the second monitor is the monitor.

12. The vacuum excavation system according to claim 4, wherein the vacuum hose comprises:
  a. a first connection section operatively and pivotally connected to the intake port of the vacuum pump;
  b. a second flexible extension section operatively attached to the first section to permit the first vehicle to be positioned at a distance from the second vehicle;
  c. a third rigid section operatively attached to the second flexible extension section and mounted to the backhoe; and
  d. a fourth section having at least one flexible piece operatively attached to the third ridge section to permit the extension and articulation of the backhoe arm and attached at its opposite end to the excavator tube.

13. The vacuum excavation system according to claim 12 wherein the third rigid section is constructed forming elbows.

14. The excavation system according to claim 12 wherein the fourth section is at least in part constructed of material have sufficient transparency to permit an operator to see excavated material passing through the fourth section.

15. The vacuum excavation system according to claim 12 wherein a vacuum gauge is mounted to the backhoe in a position for an operator of the backhoe to see, the vacuum gauge being operatively connected to the vacuum hose to measure the level of vacuum in the vacuum hose.

16. The vacuum excavation system according to claim 4 wherein the angle being selected to permit the backhoe arm to position the rigid tube perpendicular to the site to be excavated.

17. The vacuum excavation system according to claim 16 wherein the angle is between about 40° to about 50°.

18. The vacuum excavation system according to claim 4 wherein the rigid tube having an upper end attachable to the vacuum hose and a lower end having at least two positioning members extending from the lower end a predetermined distance.

19. The vacuum excavation system according to claim 4 wherein the excavator tube has affixed along its vertical outer wall surface a visual ruler for use to indicate the depth of excavation.

20. The vacuum excavation system according to claim 4 wherein the excavator tube intake port comprises a resilient coating affixed to the intake port.

21. The vacuum excavation system according to claim 4 wherein the nozzle assembly is at least partially rotatable about the rigid excavator tube.

22. The vacuum excavation system according to claim 4 wherein the nozzle assembly comprises nozzles adjustably affixed to a support ring attached to the excavator tube.

* * * * *